United States Patent
Yamaguchi et al.

(10) Patent No.: US 8,340,887 B2
(45) Date of Patent: Dec. 25, 2012

(54) FUEL CONTROL FOR INTERNAL COMBUSTION ENGINE

(75) Inventors: Satoshi Yamaguchi, Saitama (JP); Junichi Hatano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 884 days.

(21) Appl. No.: 12/467,745

(22) Filed: May 18, 2009

(65) Prior Publication Data

US 2009/0292447 A1  Nov. 26, 2009

(30) Foreign Application Priority Data

May 19, 2008  (JP) ................................ 2008-130770

(51) Int. Cl.
*G06F 19/00* (2011.01)
*F02D 41/30* (2006.01)
*F02M 51/00* (2006.01)

(52) U.S. Cl. ......... 701/104; 123/299; 123/435; 123/480

(58) Field of Classification Search .................. 123/299, 123/300, 305, 435, 436, 478, 480, 486, 488, 123/276, 304; 701/101–105, 111, 115
See application file for complete search history.

(56) References Cited

U.S. PATENT DOCUMENTS

| | | | |
|---|---|---|---|
| 6,994,077 B2 * | 2/2006 | Kobayashi et al. | 123/568.11 |
| 7,870,845 B2 * | 1/2011 | Sasaki et al. | 123/435 |
| 2005/0274352 A1 | 12/2005 | Canale et al. | |
| 2008/0167786 A1 | 7/2008 | Sasaki et al. | |
| 2008/0243358 A1 * | 10/2008 | Kojima et al. | 701/102 |
| 2010/0312454 A1 * | 12/2010 | Nada et al. | 701/103 |

FOREIGN PATENT DOCUMENTS

| | | |
|---|---|---|
| EP | 1 568 876 A2 | 8/2005 |
| JP | 06-159182 A | 6/1994 |
| JP | 11-141386 A | 5/1999 |
| JP | 11-148410 A | 6/1999 |
| JP | 2005-147025 A | 6/2005 |
| JP | 2007-023881 A | 2/2007 |

* cited by examiner

*Primary Examiner* — Willis R Wolfe, Jr.
(74) *Attorney, Agent, or Firm* — Arent Fox LLP

(57) ABSTRACT

A fuel injection control for an internal combustion engine is provided. Fuel is injected into a cylinder of the internal combustion engine. The fuel injection is divided into main injection and pilot injection in advance of the main injection. An actual compression ignition timing is detected based on a combustion state in the cylinder. A fuel injection timing of the main injection is controlled based on the actual compression ignition timing. An amount of heat release based on the pilot injection is computed. A fuel injection amount of the pilot injection is corrected based on the computed heat release amount.

6 Claims, 10 Drawing Sheets

FUEL CONTROL FOR INTERNAL COMBUSTION ENGINE

BACKGROUND OF THE INVENTION

1. Field of the Invention

The present invention relates to a fuel control for an internal combustion engine.

2. Description of the Related Art

In a technique disclosed in Japanese Patent Publication Laid-Open (JP-A) No. 6-159182, a cylinder internal pressure is detected to determine a cylinder internal pressure maximum pressure Pmax, a rate of pressure change $dP/d\theta$, and a compression ignition timing. Stability of compression ignition timing is determined from these values, and a pilot fuel amount is controlled according to the determination result.

In a technique disclosed in JP-A No. 2005-147025, an actual torque is computed according to the detected cylinder internal pressure. A correction amount is computed based on a required torque and the actual torque using a sequential statistical algorithm. A fuel injection amount is corrected according to the correction amount.

In an internal combustion engine such as a Diesel engine, the fuel injection is divided into pilot injection and main injection to sluggishly perform combustion, thereby avoiding deterioration of a combustion noise caused by the rapid combustion.

On the other hand, the combustion of the internal combustion engine may be largely fluctuated by a cetane number, humidity, deterioration of a fuel injection valve, and a variation in the compression ratio among cylinders. Therefore, a variation in an actual rate of heat release may occur in the internal combustion engine, even if the fuel injection is performed according to an injection timing and an injection amount based on a map (table) that is previously set and stored in a control apparatus.

In order to address the variation in the rate of heat release, it has been proposed that a compression ignition position of the combustion is detected with a sensor for detecting the cylinder internal pressure and/or a sensor for detecting knocking, and a feedback control is performed for the main injection.

However, even if the feedback control is performed for the main injection, deterioration of the combustion noise and/or emission may occur when the combustion by the pilot injection is lowered or excessive.

Accordingly there is a demand for a technique of being capable of avoiding such deterioration that may be caused by the combustion by the pilot injection.

SUMMARY OF THE INVENTION

In accordance with one aspect of the invention, a control for a fuel injection of an internal combustion engine is provided. The control includes injecting fuel into a cylinder of the internal combustion engine with the fuel injection divided into a main injection and a pilot injection in advance of the main injection, detecting an actual compression ignition timing based on a combustion state in the cylinder, controlling a fuel injection timing of the main injection based on the actual compression ignition timing, determining an amount of heat release based on the pilot injection, and correcting a fuel injection amount of the pilot injection based on the determined amount of heat release.

According to the invention, the fuel injection amount of the pilot injection is corrected based on the amount of heat release based on the pilot injection. Therefore, an appropriate amount of fuel can be supplied by the pilot injection even if the combustion by the pilot injection is lowered or excessive, which enables the combustion by the pilot injection to be in a normal state. As a result, the fuel injection timing of the main injection is appropriately adjusted by a feedback control of a compression ignition timing, which avoids the deterioration of the combustion noise and the deterioration of the emission.

In accordance with another aspect of the invention, the control for a fuel injection further includes determining an amount of heat release based on the main injection, and determining a ratio of the amount of heat release based on the pilot injection and an amount of heat release based on the main injection. The fuel injection amount of the pilot injection is corrected based on the determined ratio.

According to the invention, a determination whether the combustion by the pilot injection is normally performed can be made by comparing the amount of heat release of the combustion by the pilot injection and the amount of heat release of the combustion by the main injection. When the combustion by the pilot injection is lowered or when the combustion by the pilot injection becomes excessive, an appropriate amount of fuel can be supplied by the pilot injection by the correction based on the ratio. Therefore, the fuel injection timing of the main injection is appropriately adjusted by a feedback control of the compression ignition timing, which avoids the deterioration of the combustion noise and the deterioration of the emission.

In accordance with yet another aspect of the invention, the control includes determining a correction amount for causing the amount of heat release based on the pilot injection to converge to a target amount of heat release. A target injection amount is corrected with the correction amount to determine the fuel injection amount of the pilot injection.

Thus, the control is performed such that the amount of heat release based on the pilot injection converges to a target value. The combustion by the pilot injection can be in a normal state.

In accordance with yet another aspect of the invention, the control further includes determining a correction amount for causing the determined ratio to converge to a target value. A target injection amount is corrected with the correction amount to determine the fuel injection amount of the pilot injection.

Thus, when the ratio between the amount of heat release based on the main injection and the amount of heat release based on the pilot injection is used, the control is performed so as to cause the ratio to converge to a target value. The combustion by the pilot injection can be in a normal state.

DETAILED DESCRIPTION OF THE INVENTION

Figure 1:
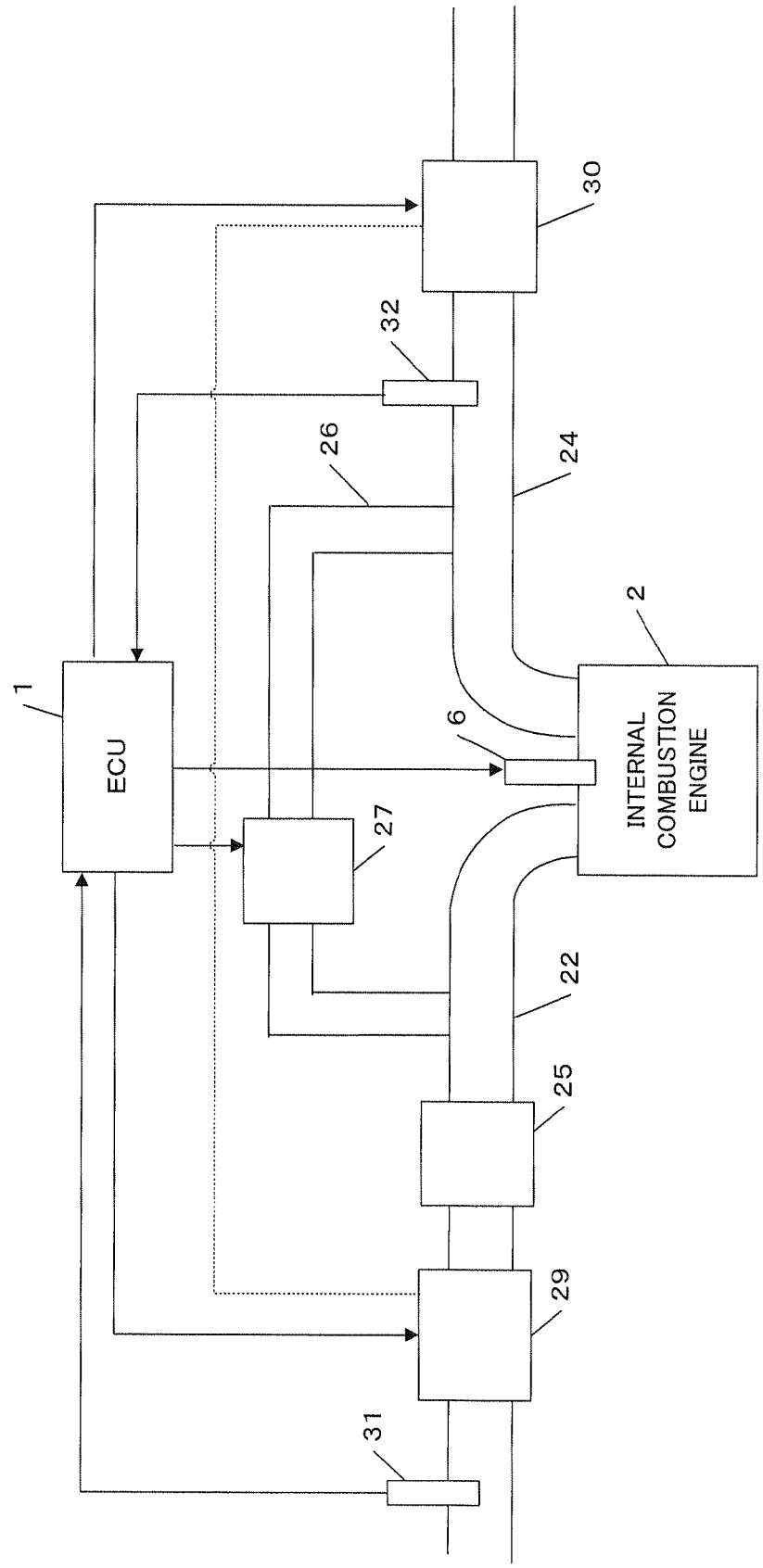
FIG. 1 schematically illustrates an engine according to an embodiment of the invention.
Figure 2:
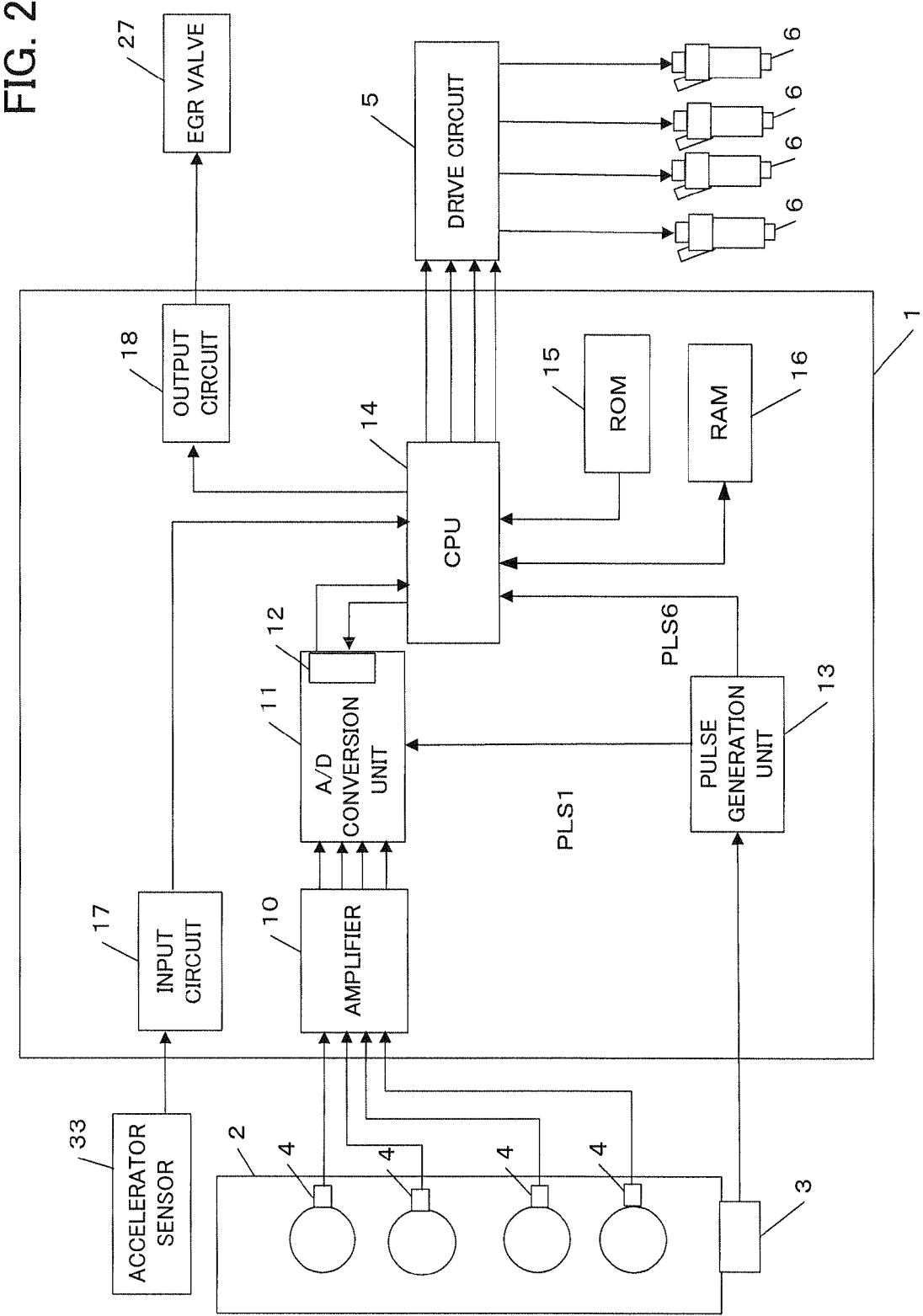
FIG. 2 schematically illustrates an engine control apparatus according to an embodiment of the invention.

Exemplary embodiments of the invention will be described below referring to the drawings. FIGS. 1 and 2 schematically illustrate an entire configuration of an internal combustion engine (hereinafter referred to as engine) and a control apparatus thereof according to one embodiment of the invention.

An Electronic Control Unit (hereinafter abbreviated to "ECU") 1 is a computer including a Central Processing Unit (CPU) 14, a Read Only Memory (ROM) 15, and a Random Access Memory (RAM) 16. One or more computer programs for implementing various kinds of control of a vehicle and data necessary to executing the programs are stored in the ROM 15. The CPU 14 receives data transmitted from each unit of the vehicle to perform an operation using the RAM 16 as a work area, produces one or more control signals, and transmits the control signals to control each unit of the engine.

In the embodiment, an engine 2 has four cylinders, and the engine 2 is a Diesel engine that directly injects the fuel into each cylinder. A fuel injection valve 6 is provided in each cylinder in such a manner as to protrude into the combustion chamber. The fuel injection valve 6 injects the fuel in accordance with a control signal supplied from the ECU 1. The ECU 1 controls a fuel injection timing and a fuel injection time (fuel injection amount).

An intake manifold 22 and an exhaust manifold 24 are coupled to the engine 2. A supercharger comprising a rotatable compressor 29 provided in the intake manifold 22 and a rotatable turbine 30 provided in the exhaust manifold 24 is provided. The turbine 30 is rotated by kinetic energy of exhaust gas, and the compressor 29 is rotated by the rotation of the turbine 30, thereby compressing an intake air.

The turbine 30 includes a plurality of rotatable variable vanes (not shown). A rotation speed of the turbine 30 can be changed by changing an opening of the variable vanes. The ECU 1 controls the opening of the variable vanes.

In the intake manifold 22, an airflow sensor 31 is provided on an upstream side of the compressor 29 in order to detect an intake air amount. A value detected by the sensor is transmitted to the ECU 1. An intercooler 25 is provided on a downstream side of the compressor 29 in order to cool the air pressurized by the supercharger.

In the engine 2, an Exhaust Gas Reflux passage (EGR passage) 26 is provided between the intake manifold 22 and an upstream side of the turbine 30 on the exhaust manifold 24. Part of the exhaust gas of the engine 2 is refluxed as an EGR gas to the intake manifold 22 through the EGR passage 26.

An EGR control valve 27 is provided in the EGR passage 26. The EGR control valve 27 is an electromagnetic valve including, for example, a solenoid. The ECU 1 controls the opening of the EGR control valve 27.

A cylinder internal pressure sensor 4 (FIG. 2) is provided in each cylinder of the engine 2 in such a manner as to protrude into the combustion chamber. The sensor detects a change in the cylinder internal pressure (combustion pressure). A value detected by the sensor 4 is transmitted to the ECU 1. A cylinder internal pressure (in-cylinder pressure) PCYL can be detected by integrating the value detected by the cylinder internal pressure sensor.

A crank angle sensor 3 is provided in the engine 2 in order to detect a rotation angle of a crankshaft (not shown). In the embodiment, the crank angle sensor 3 generates a pulse in each crank angle of one degree, and the pulse signal is transmitted to the ECU 1. The crank angle sensor 3 also produces a cylinder identifying pulse at a predetermined crank angle position of a specific cylinder, and the cylinder identifying pulse is transmitted to the ECU 1.

An accelerator sensor 33 is connected to the ECU 1 in order to detect an amount of operation AP of an accelerator pedal of the vehicle driven by the engine 2, and a detection signal of the sensor is transmitted to the ECU 1.

The ECU 1 supplies to a drive circuit 5 a control signal for a fuel injection valve 6 provided in each cylinder of the engine 2. The drive circuit 5 is connected to the fuel injection valve 6. The drive circuit 5 supplies a driving signal to the fuel injection valve 6 in accordance with the control signal supplied from the ECU 1. Thus, an amount of fuel in accordance with the control signal from the ECU 1 is injected into the combustion chamber of each cylinder at a fuel injection timing in accordance with the control signal from the ECU 1.

In addition to the CPU 14, ROM 15, and RAM 16, the ECU 1 includes an amplifier 10, an A/D conversion unit 11, a pulse generation unit 13, an input circuit 17, and an output circuit 18. The detection signal of the cylinder internal pressure sensor 4 is fed into the amplifier 10. The amplifier 10 amplifies the fed signal. The amplified signal is fed into the A/D conversion unit 11. The pulse signal supplied from the crank angle sensor 3 is fed into the pulse generation unit 13.

The pulse generation unit 13 supplies a pulse signal in each crank angle of one degree (hereinafter referred to as one-degree pulse (PLS1)). The A/D conversion unit 11 samples an output of the cylinder internal pressure sensor from the amplifier 10 in a cycle of the one-degree pulse. The A/D conversion unit 11 converts the output into a digital value ($dp/d\theta$) (referred to as rate of pressure change) and stores the digital value in the buffer 12.

On the other hand, the pulse generation unit 13 supplies a pulse signal to the CPU 14 in each crank angle of six degrees (hereinafter referred to as six-degree pulse (PLS6)). The CPU 14 can read the digital value stored in the buffer 12 in a cycle of the six-degree pulse. That is, in the embodiment, the A/D conversion unit 11 does not make an interrupt signal to the CPU 14. Instead, the CPU 14 reads the digital value in a cycle of the six-degree pulse. The CPU 14 computes the in-cylinder pressure PCYL by integrating the rate of pressure change thus read.

The input circuit 17 converts detection signals of various sensors (In the example of FIG. 2, only the accelerator sensor 33 is illustrated) into digital values and supplies the digital values to the CPU 14. An engine rotational speed Ne is determined based on the cycle of the six-degree pulse. A required torque TRQ of the engine 2 is determined based on the amount of operation AP of the accelerator pedal detected by the accelerator sensor 33.

The CPU 14 transmits a control signal to each unit of the vehicle through the output circuit 18. In the example of FIG. 2, the CPU 14 determines a target exhaust gas reflux amount according to an engine operating state, and the CPU 14 supplies a duty control signal to the EGR control valve 27 through the output circuit 18. The duty control signal is used to control the opening of the EGR control valve 27 according to the target exhaust gas reflux amount.

Here, a principle of a technique according to a first embodiment of the invention will be described referring to FIG. 3. For a first case A1, a second case B1, and a third case C1, (a) illustrates a fuel injection time, (b) illustrates a rate of heat release, and (c) illustrates an amount of heat release. In (b) and (c), reference numerals 81a, 82a, and 83a indicate the first case A1, reference numerals 81b, 82b, and 83b indicate the second case B1, and reference numerals 81c, 82c, and 83c indicate the third case C1.

The first case A1 shows a normal combustion obtained by performing the pilot injection and the main injection according to a target fuel injection amount and a target fuel injection timing (which are previously stored in the memory of the ECU 1) corresponding to the engine operating state. As illustrated in (a), the pilot injection is performed for a predetermined time period in advance of the main injection. For example, the main injection is performed in the compression stroke, and the pilot injection is performed in the intake stroke. The deterioration of the combustion noise and the deterioration of the emission, which may be caused by the rapid combustion, can be avoided by dividing the fuel injection into the pilot injection and the main injection.

In the first case A1, the rate of heat release (J/deg) is increased in response to the pilot injection as indicated by reference numeral 81a of (b), and then the rate of heat release is increased in response to the main injection as indicated by reference numeral 82a. As indicated by reference numeral 83a of (c), the amount of heat release (J) that is computed by integrating the rate of heat release is increased according to the pilot injection and the main injection.

In this embodiment, a position (Qhalf) that is of 50% of a summation Qmax of the amount of heat release according to the pilot injection and the main injection is detected as a compression ignition timing (which is a timing of ignition caused not by a spark plug but by the compression of the air-fuel mixture). In FIG. 3, the position that is detected as the compression ignition timing is shown with a dotted line 101. A crank angle corresponding to an intersection of the dotted line 101 and the amount of heat release 83a is detected as an actual compression ignition timing.

The second case B1 indicates a case in which the combustion by the pilot injection is lowered. Such a case may occur, for example, when the EGR amount that is larger than a target value is refluxed to the intake system, when the fuel is deficient due to the deterioration of the fuel injection valve or when the cetane number is low. In such a case, as indicated by the dotted line 81b', the amount of heat release based on the pilot injection is lowered. As a result, as indicated by the dotted line 83b', time detected as the compression ignition timing is delayed. When a feedback control for the compression ignition timing is performed, the control acts to advance the fuel injection timing of the main injection so as to advance the compression ignition timing because the delayed compression ignition timing is detected. Because an interval (crank angle period) between the pilot injection and the main injection is kept constant, the fuel injection timing of the pilot injection is advanced as illustrated in (a) when the fuel injection timing of the main injection is advanced. Accordingly, as indicated by numerals 81b and 82b, the rise of the heat release is advanced rather than that of reference numerals 81b' and 82b' (this phenomenon is indicated by the arrow 102), and whereby the rise of the amount of heat release is advanced rather than that of reference numeral 83b' as indicated by reference numeral 83b.

In this case, as indicated by numerals 81b and 82b, the rapid combustion occurs by the main injection while the combustion by the pilot injection remains lowered. Accordingly, the rate of pressure change is increased to possibly deteriorate the noise and vibration (NV) and the emission. As illustrated in (c), because the compression ignition timing may be detected at the same timing as the first case A1 by the action of the feedback control for the compression ignition timing, it is difficult that the action of the feedback control avoids such deterioration of the noise and vibration and the emission.

Figure 3:
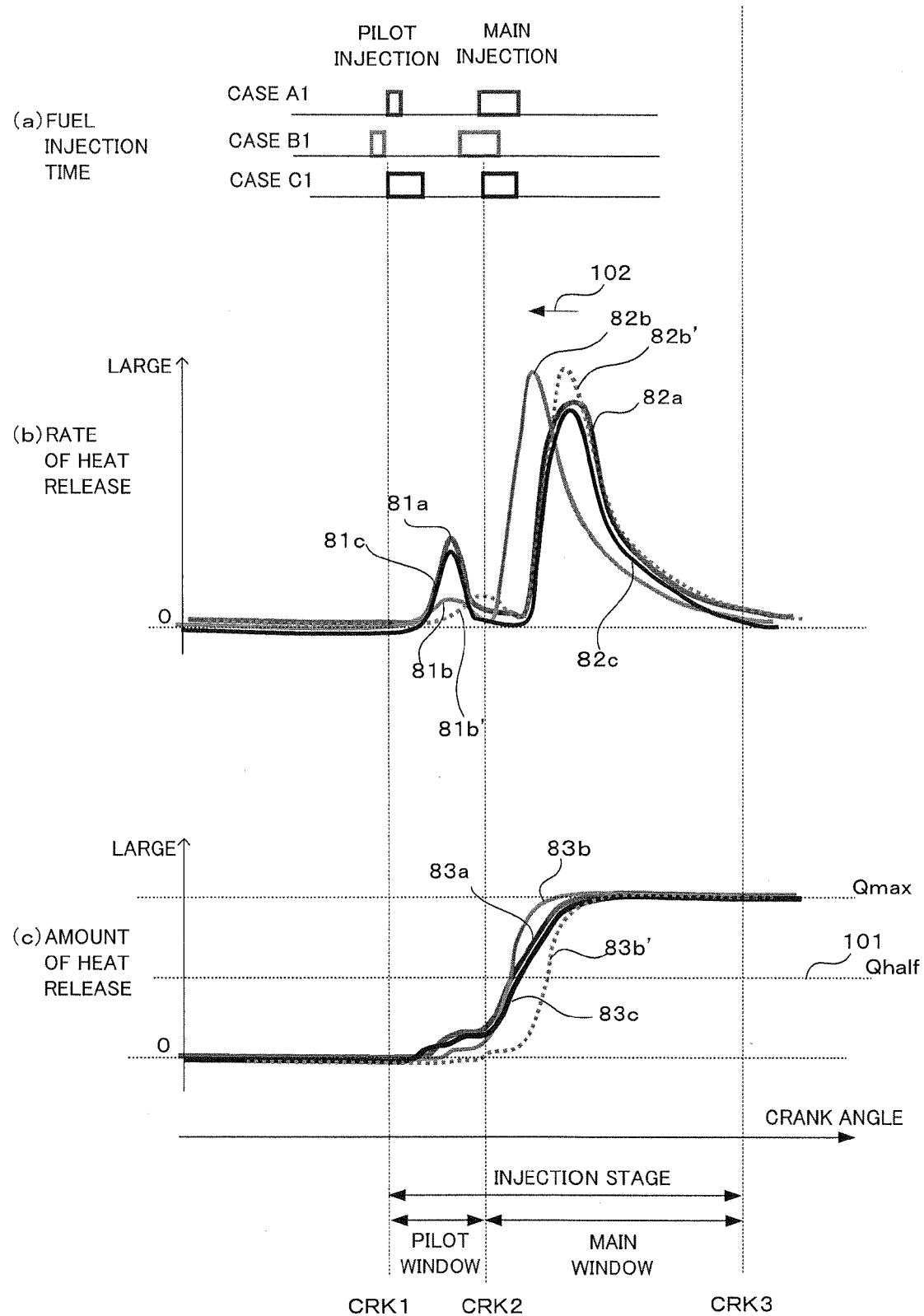
FIG. 3 is a view for explaining a principle of a technique according to a first embodiment of the invention.

Therefore, in one embodiment of the invention, as illustrated in FIG. 3, a pilot window (for example, which can be set based on the engine operating state, and the length of the pilot window is about five degrees in terms of the crank angle, as described later) is set as a period during which heat is generated by the pilot injection. The amount of heat release in the pilot window is computed. If the computed amount of heat release does not reach a predetermined target value, it indicates that the combustion by the pilot injection is lowered. Therefore, the fuel injection amount of the pilot injection is increased.

In this embodiment, in order to detect the actual compression ignition timing, in addition to the pilot window, a main window is set as a period during which heat is generated by the main injection. A crank angle period from the beginning of the pilot window to the end of the main window is set as an injection stage period. The main window may be also set based on the engine operating state as described later. In this embodiment, the pilot window and the main window are continuously illustrated. However, it is not necessary to continuously set the pilot window and the main window. The summation Qmax of the amount of heat release as described above is the amount of heat release in the injection stage period. The crank angle corresponding to the amount of heat release Qhalf that is of 50% of the summation Qmax is detected as the actual compression ignition timing. FIG. 3 illustrates one example of the pilot window and the main window thus set at certain timing.

The result according to this embodiment is indicated as the third case C1. When the fuel injected by the pilot injection is increased, the rate of heat release indicated by reference numeral 81c is increased in the pilot window period similarly to the rate of heat release 81a of the first case A1. Accordingly, as indicated by numeral 83c, the amount of heat release of the pilot injection is increased similarly to the amount of heat release 83a of the first case A1. The compression ignition timing is detected at the same timing as the first case A1. As a result, as illustrated in (a), the injection timing of the main injection is delayed compared with the second case B1, and the main injection is set at the injection timing similar to that of the first case A1. The fuel injection amount of the main injection is decreased by an amount equal to the increase in the fuel injection amount of the pilot injection. Accordingly, as indicated by numeral 82c, the rise of the rate of heat release of the main injection exhibits a behavior similar to that of the rate of heat release 82a of the first case A1, which prevents the rapid combustion of the main injection from occurring and avoids the deterioration of NV. Further, because the feedback control for the compression ignition timing is performed even if the fuel injection amount of the pilot injection is adjusted in the above-described way, it can be avoided that such adjustment of the fuel injection amount of the pilot injection deteriorates the noise and vibration (NV) and the emission.

As described above, FIG. 3 illustrates the case in which the combustion by the pilot injection is lowered. On the other hand, FIG. 4 illustrates a case in which the combustion by the pilot injection becomes excessive.

Figure 4:
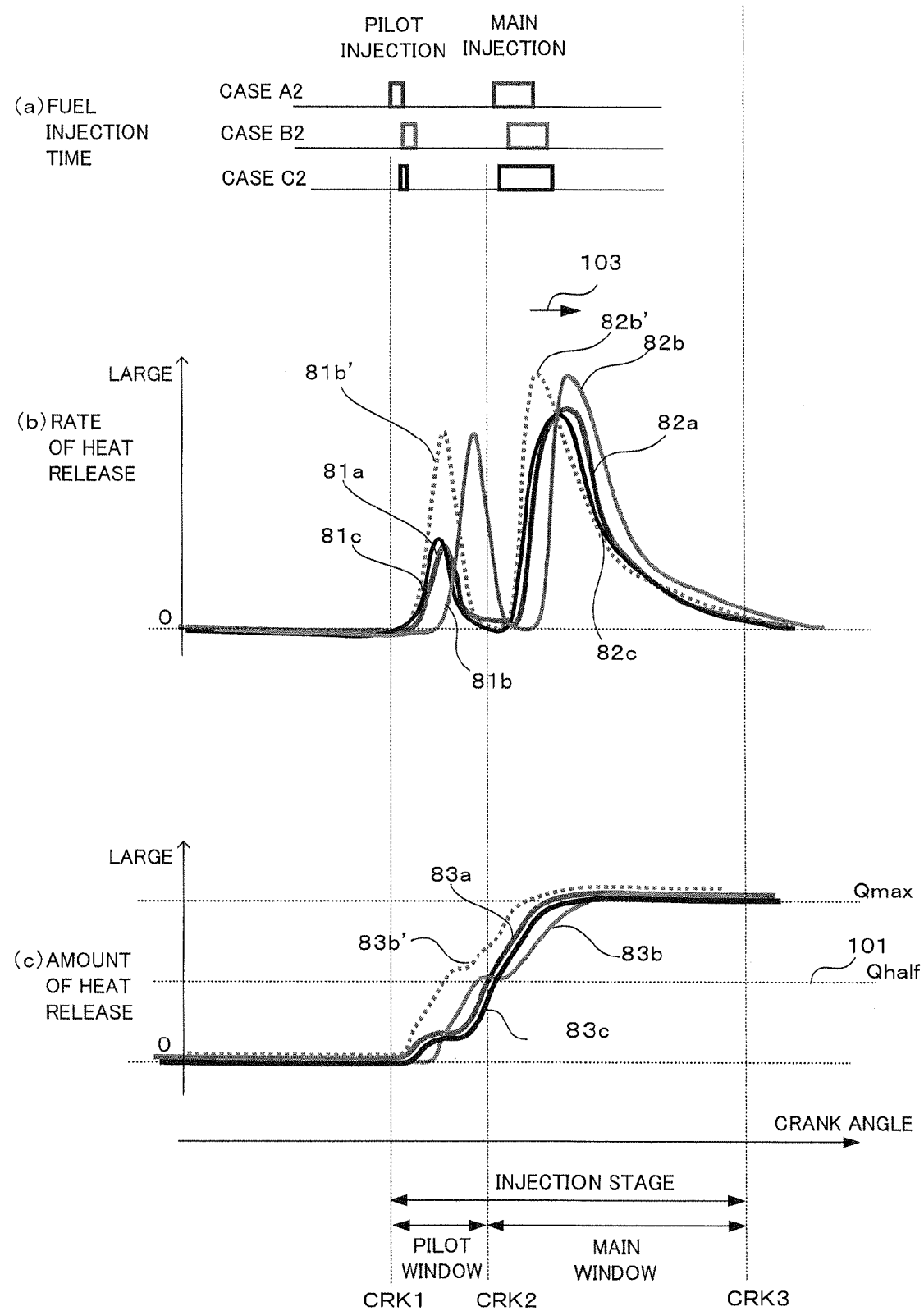
FIG. 4 is a view for explaining a principle of a technique according to a first embodiment.

As with FIG. 3, FIG. 4 illustrates a first case A2, a second case B2, and a third cases C2. The first case A2 is similar to the first case A1 of FIG. 3 and indicates the normal combustion state. For the sake of convenience, the numerals in (b) and (c) in FIG. 4 are similar to those of FIG. 3. However, it is noted that (b) and (c) of FIG. 4 illustrate the phenomena that are different from those of FIG. 3.

The second case B2 indicates a case in which the combustion by the pilot injection becomes excessive. Such a case may occur when the EGR amount that is smaller than a target value is refluxed to the intake system, when the fuel becomes excessive due to the deterioration of the fuel injection valve or when the cetane number is high.

In such a case, because the amount of heat release based on the pilot injection is increased as indicated by the dotted line 81b', the time that is detected as the compression ignition timing is advanced as indicated by the dotted line 83b'. When the feedback control for the compression ignition timing is performed, the feedback control acts to retard the fuel injection timing of the main injection so as to retard the compression ignition timing because the advanced compression ignition timing is detected. Because the interval (crank angle period) between the pilot injection and the main injection is kept constant, the fuel injection timing of the pilot injection is retarded as illustrated in (a) when the fuel injection timing of the main injection is retarded. Accordingly as indicated by reference numerals 81b and 82b, the rise of the rate of heat release is retarded rather than that of reference numerals 81b' and 82b' (this phenomenon is indicated by the arrow 103), and whereby the rise of the amount of heat release is retarded rather than that of reference numeral 83b' as indicated by reference numeral 83b.

In this case, as indicated by reference numerals 81b and 82b, because the combustion by the pilot injection is excessive, the combustion by the main injection is further activated. Therefore, the behavior that is different from that of the rate of heat release indicated by the first case A2 is exhibited. This may deteriorate the noise and vibration (NV) and the emission. As indicated by reference numeral 83b of (c), the compression ignition timing is detected at the same timing as the first case A1 by the action of the feedback control for the compression ignition timing. Therefore, it is difficult that the action of the feedback control avoids such deterioration of the noise and vibration and the emission.

Therefore, in one embodiment of the invention, as described above referring to FIG. 3, the pilot window is set as the period during which heat is generated by the pilot injection. The amount of heat release in the pilot window is computed. If the computed amount of heat release exceeds a predetermined target value, it indicates that the combustion by the pilot injection becomes excessive, Therefore, the fuel injection amount of the pilot injection is decreased.

The result according to this embodiment is indicated as the third case C2. When the fuel injected by the pilot injection is decreased, the rate of heat release indicated by reference numeral 81c is increased in the pilot window period similarly to the rate of heat release 81a of the first case A2. Accordingly, as indicated by reference numeral 83c, the amount of heat release based on the pilot injection is increased similarly to the amount of heat release 83a of the first case A2. The compression ignition timing is detected at the same timing as the first case A2. As a result, as illustrated in (a), the injection timing of the main injection is advanced compared with the second case B2, and the main injection is set at the injection timing similar to that of the first case A2. The fuel injection amount of the main injection is increased by an amount equal to the decrease in the fuel amount of the pilot injection. Accordingly, as indicated by reference numeral 82c, because the rise of the rate of heat release based on the main injection exhibits the behavior similar to that of the rate of heat release 82a of the first case A2, the deterioration of NV and emission can be avoided. Because the feedback control for the compression ignition timing is performed even if the fuel injection amount of the pilot injection is adjusted, it can be avoided that the adjustment of the fuel injection of the pilot injection deteriorates the NV and the emission.

Figure 5:
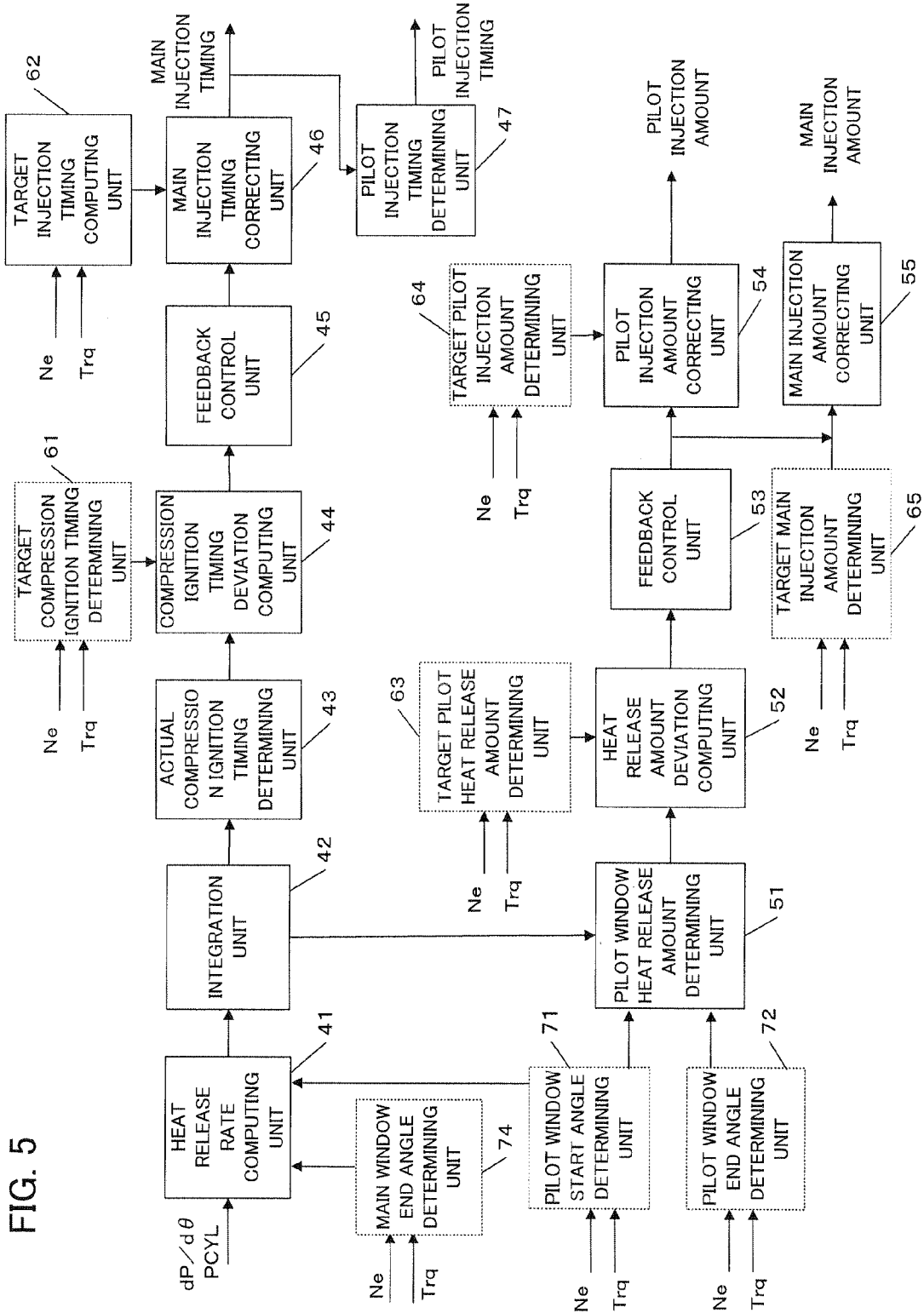
FIG. 5 is a block diagram illustrating a control apparatus according to the first embodiment.

FIG. 5 is a block diagram illustrating a control apparatus in accordance with the first embodiment of FIGS. 3 and 4. Each functional block is implemented in the ECU 1. The following various maps are stored in the ROM 15 of the ECU 1.

A heat release rate computing unit 41 computes the rate of heat release ROHR (J/deg) based on the rate of pressure change and the in-cylinder pressure, which are detected by the cylinder internal pressure sensor 4. An example of an equation for the computation is shown as follows:

$$ROHR(\theta) = \frac{\kappa}{(\kappa-1)} \times PCYL(\theta) \times \frac{dV}{d\theta}(\theta) + \frac{1}{(\kappa-1)} \times VCYL(\theta) \times \frac{dP}{d\theta}(\theta) \times 10^{-3}$$ [Equation 1]

Here, $\theta$ is the crank angle, $\kappa$ is a specific-heat ratio of air-fuel mixture, VCYL is a cylinder volume ($m^3$), $dV/d\theta$ is a rate of volume increase in the cylinder ($m^3$/deg), PCYL is the in-cylinder pressure (kPa), and $dP/d\theta$ is the rate of pressure change (kPa/deg). It is desirable to use the specific-heat ratio $\kappa$ corresponding to the type of fuel. For example, the specific-heat ratio of light oil can be used in the Diesel engine.

The volume of the cylinder combustion chamber VCYL corresponding to the crank angle $\theta$ can be computed according to the following equation:

$$m = r\{(1-\cos\theta) + \lambda - \sqrt{\lambda^2 - \sin^2\theta}\}$$

$$VCYL = V_{dead} + A_{pstn} \times m$$ [Equation 2]

Figure 6:
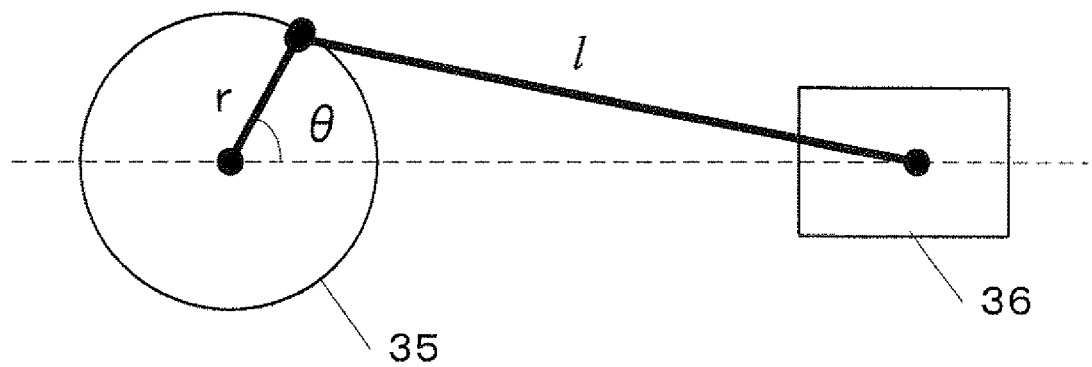
FIG. 6 is a conceptual view for computing a combustion volume according to an embodiment of the invention.

Here, m is a displacement from the top dead center of the piston in the cylinder. As illustrated in FIG. 6, $\lambda = l/r$ where r is a radius of the crankshaft 35 and l is a length of the connecting rod. Vdead is the combustion chamber volume when the piston 36 is located at the top dead center, and Apstn is a sectional area of the piston 36.

In the first embodiment, as described referring to FIG. 3, the summation Qmax of the amount of heat release during the injection stage period in one combustion cycle is computed, and the crank angle (heat release barycentric position) at which the amount of heat release reaches the amount of heat release Qhalf that is of 50% of the summation Qmax is detected as the actual compression ignition timing. Thus, the heat release rate computing unit 41 computes the rate of heat release in the injection stage period. In the first embodiment, the injection stage period is a period from the crank angle corresponding to the beginning of the pilot window to the crank angle corresponding to the end of the main window. Here, a pilot window start angle determining unit 71 and a main window end angle determining unit 74 can obtain the beginning of the pilot window and the end of the main window, respectively, by referring to a corresponding predetermined map based on the current engine rotational speed Ne and the required torque Trq.

An integration unit 42 computes the amount of heat release Q by integrating the rate of heat release ROHR ($\theta$) computed by the heat release rate computing unit 41. The integration is performed over the injection stage period, thereby computing the summation Qmax of the amount of heat release. As illustrated in FIG. 3, for example, the summation Qmax of the amount of heat release is computed by integrating the rate of heat release from the crank angle CRK1 to the crank angle CRK3.

An actual compression ignition timing determining unit 43 detects the crank angle (heat release barycentric position) as the actual compression ignition timing CAFM when the amount of heat release Q reaches 50% (Qhalf=Qmax×½) of the summation Qmax of the amount of heat release.

A target compression ignition timing determining unit 61 obtains a target compression ignition timing CAFM_CMD by referring to a predetermined map based on the current engine rotational speed Ne and the required torque Trq. A compression ignition timing deviation computing unit 44 computes a deviation DCAM by subtracting the target compression ignition timing CAFM_CMD from an actual compression ignition timing CAFM. A feedback control unit 45 determines a correction amount CADM for the fuel injection timing of the main injection in order to cause the deviation DCAM to converge to zero. Any feedback control technique such as PI control can be used.

A target injection timing computing unit 62 obtains a target injection timing CAIM_CMD by referring to a predetermined map based on the current engine rotational speed Ne and the required torque Trq. A main injection timing correcting unit 46 corrects the target injection timing by adding the correction amount CADM to the target injection timing CAIM_CMD to determine the fuel injection timing CAIM of the main injection.

In the first embodiment, because the interval (length in terms of the crank angle) between the main injection timing and the pilot injection timing is kept constant, a pilot injection timing determining unit 47 can determine, as the fuel injection timing CAIP of the pilot injection, a timing that is the above interval advanced from the main injection timing CAIM. Thus, the fuel injection timing is determined for both the pilot injection and the main injection.

On the other hand, a pilot window heat release amount determining unit 51 determines the amount of heat release in the pilot window. Specifically, the pilot window start angle determining unit 71 and a pilot window end angle determining unit 72 can obtain the crank angle corresponding to the beginning of the pilot window and the crank angle corresponding to the end of the pilot window, respectively, by referring to a corresponding predetermined map based on the current engine rotational speed Ne and the required torque Trq. As described above, the integration unit 42 integrates the rate of heat release rate over the period from the beginning of the pilot window to the end of the main window. Therefore, the pilot window heat release amount determining unit 51 can receive an amount Qp of heat release that is integrated only over the pilot window period from the integration unit 42.

A target pilot heat release determining unit 63 obtains a target amount Qp_CMD of heat release by referring to a predetermined map based on the current engine rotational speed Ne and the required torque Trq. A heat release amount deviation computing unit 52 computes a deviation DQp by subtracting the target amount Qp_CMD of heat release from the actual amount Qp of heat release. A feedback control unit 53 determines a correction amount QINJDP for the fuel injection amount of the pilot injection in order to cause the deviation DQp to converge to zero. Any feedback control technique such as PI control can be used.

A target pilot injection amount determining unit 64 obtains a target pilot fuel injection amount QINJP_CMD by referring to a predetermined map based on the current engine rotational speed Ne and the required torque Trq. A pilot injection amount correcting unit 54 corrects the target pilot fuel injection amount by adding the correction amount QINJDP to the target pilot fuel injection amount QINJP_CMD, to determine the fuel injection amount QINJP of the pilot injection.

When the actual amount Qp of heat release is lower than the target amount Qp_CMD of heat release, the fuel injection amount of the pilot injection is increased such that the actual amount of heat release follows the target amount of heat release. On the other hand, when the actual amount Qp of heat release is larger than the target amount Qp_CMD of heat release, the fuel injection amount of the pilot injection is decreased such that the actual amount of heat release follows the target amount of heat release.

A target main injection amount determining unit 65 obtains a target main injection amount QINJM_CMD by referring to a predetermined map based on the current engine rotational speed Ne and the required torque Trq. A main injection amount correcting unit 55 corrects the target main injection amount QINJM_CMD with the correction amount QINJDP to determine a fuel injection amount QINJM of the main injection. Specifically, when the correction for the pilot injection is performed such that the pilot injection amount is increased by the correction amount, the fuel injection amount for the main injection is corrected such that the main injection amount is decreased by the correction amount. When the correction for the pilot injection is performed such that the pilot injection amount is decreased by the correction amount, the fuel injection amount for the main injection is corrected such that the main injection amount is increased by the correction amount. Thus, a desired fuel amount is supplied to the engine even if the fuel injection amount for the pilot injection is corrected.

Figure 7:
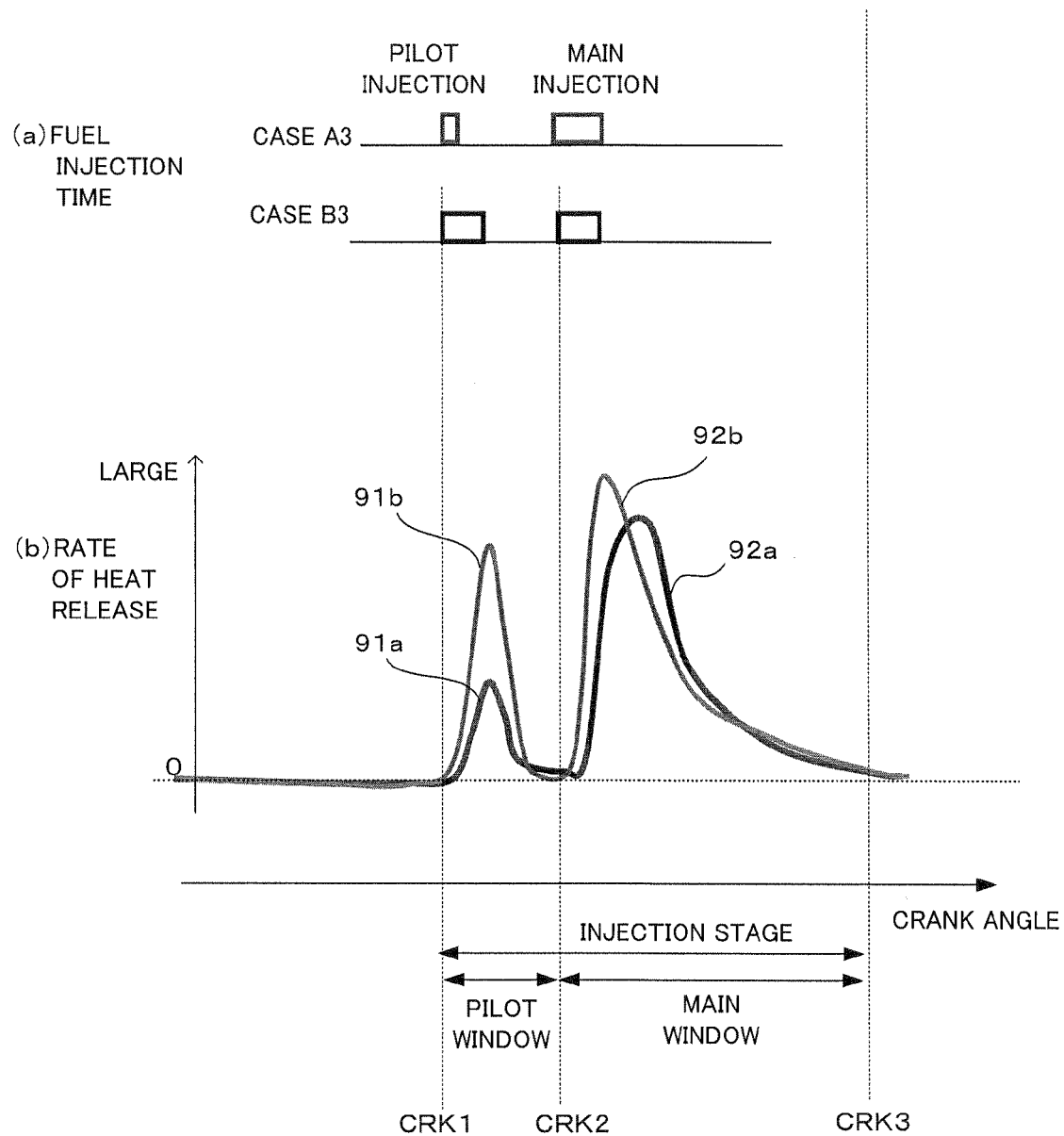
FIG. 7 is a view for explaining a principle of a technique according to a second embodiment of the invention.

FIG. 7 is a view for explaining a principle of a technique according to a second embodiment of the invention. For a first case A3 and a second case B3, (a) illustrates a fuel injection time and (b) illustrates a rate of heat release. The amount of heat release is omitted in the figure. In (b), reference numerals 91a and 92a indicate the first case A3, and reference numerals 91b and 92b indicate the second case B3.

The first case A3 indicates a normal combustion obtained by performing the pilot injection and the main injection according to a target fuel injection amount and a target fuel injection timing (which are previously stored in the memory of the ECU 1) corresponding to the engine operating state. The first case A3 is similar to the first cases A1 and A2 illustrated in FIGS. 3 and 4.

In the second case B3, the combustion by the pilot injection becomes excessive. As described above, such a case may occur due to disturbance such as when the EGR amount that is smaller than a target value is refluxed to the intake system, when the fuel becomes excessive due to the deterioration of the fuel injection valve or when the cetane number is high.

In the first embodiment as described above, the determination whether a normal combustion by the pilot injection is implemented is made by computing the amount of heat release in the pilot window. In the second embodiment, the combustion by the pilot injection and the combustion by the main injection are compared, and the determination whether a normal combustion by the pilot injection is implemented is made based on the comparison result.

As shown in the figure, a ratio R (=Qm/Qp) of an amount Qm of heat release in the main window that is set as a period during which the combustion by the main injection is performed, to an amount Qp of heat release in the pilot window that is set as a period during which the combustion by the pilot injection is performed, is computed. The ratio R when the combustion by the pilot injection becomes excessive is smaller than the ratio R when a normal combustion such as the first case A3 is implemented. For example, the ratio R becomes 8 in the case of the first case A3, and the ratio R becomes 4 in the case of the second case B3. Although not illustrated, the ratio R when the combustion by the pilot injection is lowered is larger than the ratio R when a normal combustion such as the first case A3 is implemented. Accordingly, the fuel injection amount of the pilot injection is decreased when the ratio is smaller than a target value that indicates a normal combustion. The fuel injection amount of the pilot injection is increased when the ratio is larger than the target value. Thus, the deterioration of the NV and the emission, which may be caused by the pilot injection, can be avoided.

In the second embodiment, as with the first embodiment, the feedback control for the compression ignition timing is performed, so that the compression ignition timing can be maintained at an appropriate value even if the fuel injection amount of the pilot injection is adjusted.

Figure 8:
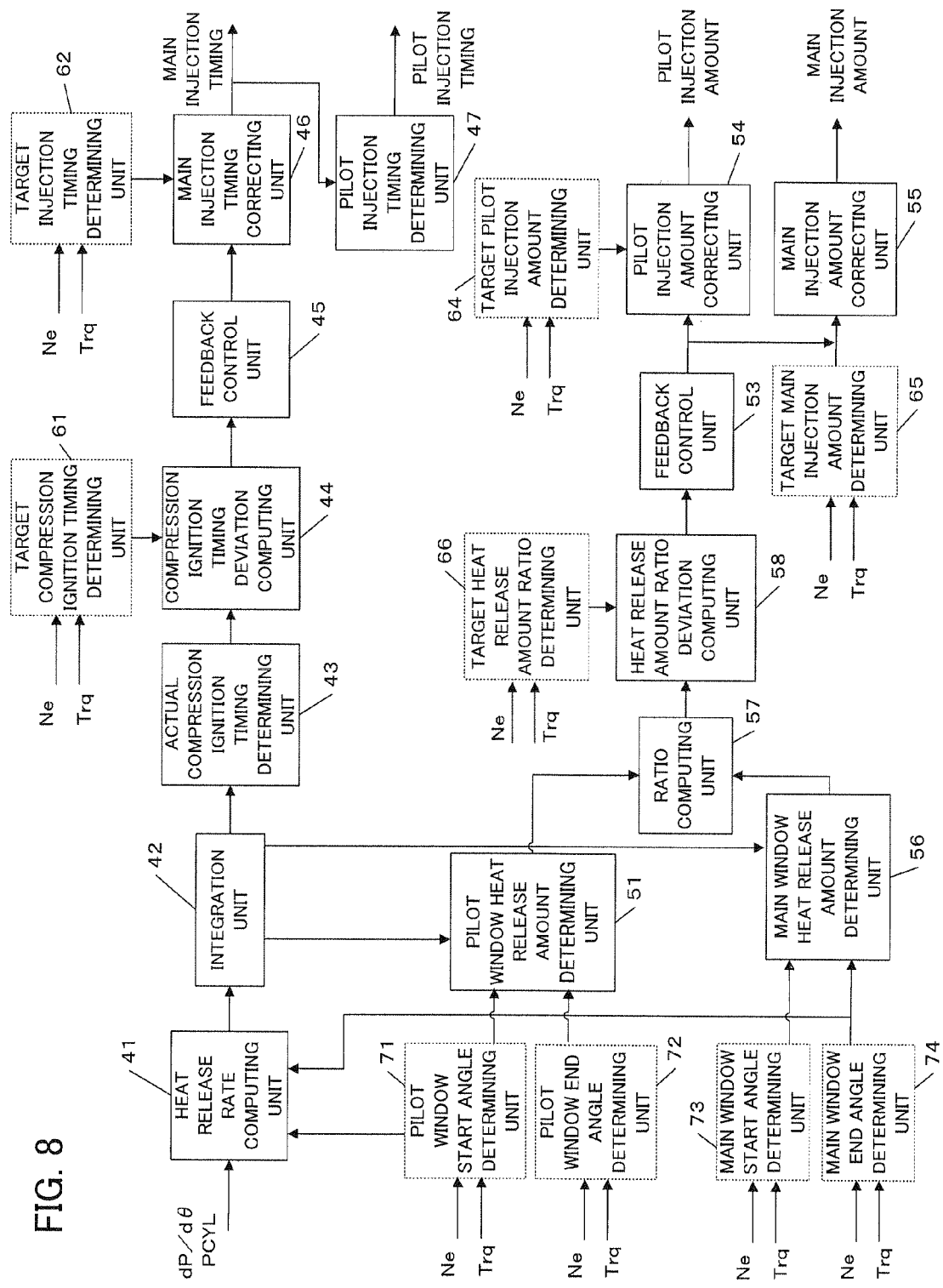
FIG. 8 is a block diagram illustrating a control apparatus according to the second embodiment.

FIG. 8 is a block diagram illustrating a control apparatus in accordance with the second embodiment of FIG. 7. The points different from those of the first embodiment of FIG. 5 will be mainly described below.

As described in the first embodiment, the heat release rate computing unit 41 computes the rate of heat release ROHR (J/deg) over the injection stage period according to the equation (1). The integration unit 42 integrates the rate of heat release over the injection stage period to compute the summation Qmax of the amount of heat release.

As with the first embodiment, the pilot window heat release amount determining unit 51 receives the amount Qp of heat release integrated only over the pilot window period from the integration unit 42. A main window start angle determining unit 73 and the main window end angle determining unit 74 can obtain the crank angle corresponding to the beginning of the main window and the crank angle corresponding to the end of the main window, respectively, by referring to a corresponding predetermined map based on the current engine rotational speed Ne and the required torque Trq. As described above, because the integration unit 42 integrates the rate of heat release over the period from the beginning of the pilot window to the end of the main window, a main window heat release amount determining unit 56 can receive the amount Qm of heat release integrated only over the main window period from the integration unit 42.

A ratio computing unit 57 computes the ratio R (=Qm/Qp) of the amount Qm of heat release in the main window to the amount Qp of heat release in the pilot window. A target heat release amount ratio determining unit 66 obtains a target value R_CMD of the rate of heat release amount by referring to a predetermined map based on the current engine rotational speed Ne and the required torque Trq. A heat release amount ratio deviation computing unit 58 computes a deviation Rd by subtracting the target value R_CMD of the ratio of heat release from the actual ratio of heat release amount R. The feedback control unit 53 determines the correction amount for the fuel injection amount of the pilot injection in order to cause the deviation Rd to converge to zero. The fuel injection amount of the pilot injection is computed by adding the correction amount to the target pilot injection amount. The correction is made such that the fuel injection amount of the pilot injection is decreased when the ratio R is smaller than the target value. The correction is made such that the fuel injection amount of the pilot injection is increased when the ratio R is larger than the target value.

Because the operation of the main injection amount correcting unit 55 is the same as that of the first embodiment, the description thereof is omitted. Because the operations from the actual compression ignition timing determining unit 43 to the pilot injection timing determining unit 47 are the same as those of the first embodiment, the description thereof is omitted.

Alternatively a ratio R' (=Qp/Qm) of the heat release amount Qp in the pilot window to the heat release amount Qm in the main window may be used instead of the ratio R. In such a case, the correction is made such that the fuel injection amount of the pilot injection is increased when the ratio R' is smaller than a target value, and the correction is made such that the fuel injection amount of the pilot injection is decreased when the ratio R' is larger than the target value.

In the above embodiments, the summation Qmax of the amount of heat release is used to detect the actual compression ignition timing. Alternatively, because the actual compression ignition timing can be detected by determining the combustion state, another appropriate technique of determining the combustion state may be used. For example, the time at which the rate of pressure change $dP/d\theta$ of the in-cylinder pressure PCYL reaches a predetermined threshold may be detected as the actual compression ignition timing. In such a case, the integration of the rate of heat release is performed only for the pilot window in the first embodiment of FIG. 5, and the integration is not required for the main window.

Figure 9:
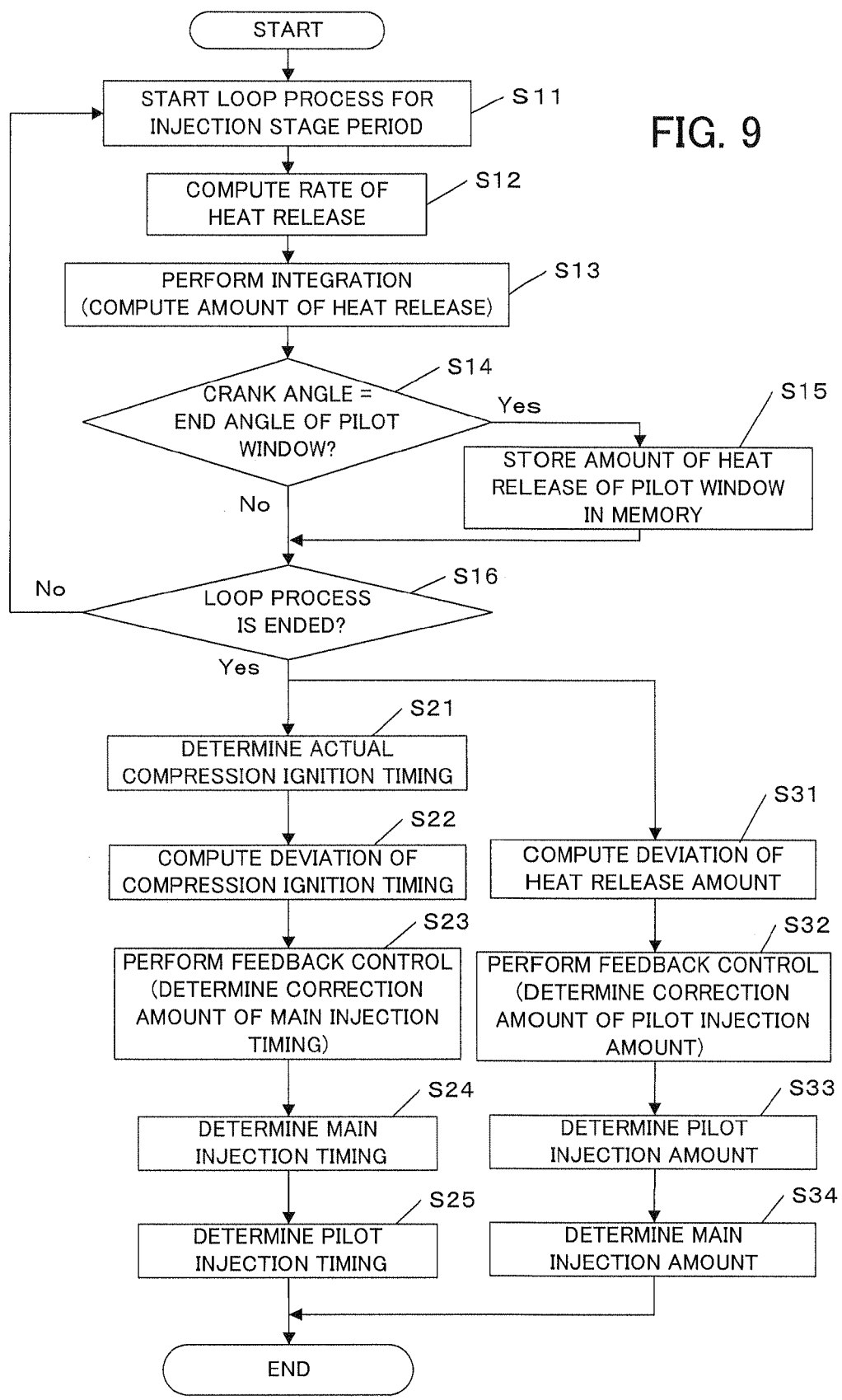
FIG. 9 is a flowchart illustrating a fuel control process according to the first embodiment.

FIG. 9 is a flowchart illustrating a fuel control process according to the first embodiment of FIG. 5. The CPU 14 performs the fuel control process in each combustion cycle after the injection stage is completed (for example, during exhaust stroke). It is assumed that the rate of pressure change $dP/d\theta$ and the in-cylinder pressure PCYL are computed in the injection stage in each predetermined crank angle (for example, one degree) and stored in a predetermined buffer (or memory). In the following process, an operation is performed using the stored rate of pressure change $dP/d\theta$ and the in-cylinder pressure PCYL.

In step S11, a loop process in which steps S12 to S15 are repeated is started. That is, a process is repeated for sequentially reading out the rate of pressure change $dP/d\theta$ and the in-cylinder pressure PCYL in each predetermined crank angle in the injection stage period to compute the rate of heat release ROHR according to the equation (1) (S12), and computing a current value Q of the amount of heat release by adding the computed rate of heat release to a previous value of the amount of heat release (S13). As described above, the crank angle corresponding to the beginning of the injection stage and the crank angle corresponding to the end of the injection stage are the crank angle corresponding to the beginning of the pilot window and the crank angle corresponding to the end of the main window, respectively. Te crank angle corresponding to the beginning of the injection stage and the crank angle corresponding to the end of the injection stage can be obtained by referring to a corresponding predetermined map based on the detected engine rotational speed Ne and the required torque Trq.

After the integration in step S13, if the crank angle used in the integration corresponds to the end angle of the pilot window, it indicates that the amount Q of heat release computed in step S13 indicates the amount Qp of heat release of the pilot window. Thus, the amount Q of heat release is stored in a memory (S15). Here, as described above, the end angle of the pilot window can be obtained by referring to a predetermined map based on the detected engine rotational speed Ne and the required torque Trq.

If the loop process is ended in step S16, the fuel injection timing of the main injection and the fuel injection timing of the pilot injection are determined in steps S21 to S25. The fuel injection amount of the main injection and the fuel injection amount of the pilot injection are determined in steps S31 to S34. The process in steps S21 to S25 and the process in steps S31 to S34 can be concurrently performed as illustrated in FIG. 9. Alternatively, the process in steps S21 to S25 and the process steps S31 to S34 may be performed in series.

In step S21, a crank angle corresponding to the half Qhalf of the summation Qmax of the heat release amount computed at the end of the loop process is determined as the actual compression ignition timing. In step S22, a deviation between the actual compression ignition timing and a target compression ignition timing is computed. In step S23, a correction amount for causing the deviation to converge to zero is determined. In step S24, the target injection timing is corrected with the correction amount to determine the fuel injection timing of the main injection. In step S25, a crank angle that is advanced by a predetermined interval from the fuel injection timing of the main injection is determined as the fuel injection timing of the pilot injection.

In step S31, a deviation between the amount Qp of heat release of the pilot window, which is stored in the memory in step S15, and a target value Qp_CMD is computed. In step S32, a correction amount for causing the deviation to converge to zero is determined. In step S33, a target pilot injection amount is corrected with the correction amount to determine the fuel injection amount of the pilot injection. In step S34, a target main injection amount is corrected with the correction amount to determine the fuel injection amount of the main injection. Here, if the correction amount increases the pilot injection amount, the correction amount is subtracted from the target main injection amount to determine the main injection amount. If the correction amount decreases the pilot injection amount, the correction amount is added to the target main injection amount to determine the main injection amount.

Figure 10:
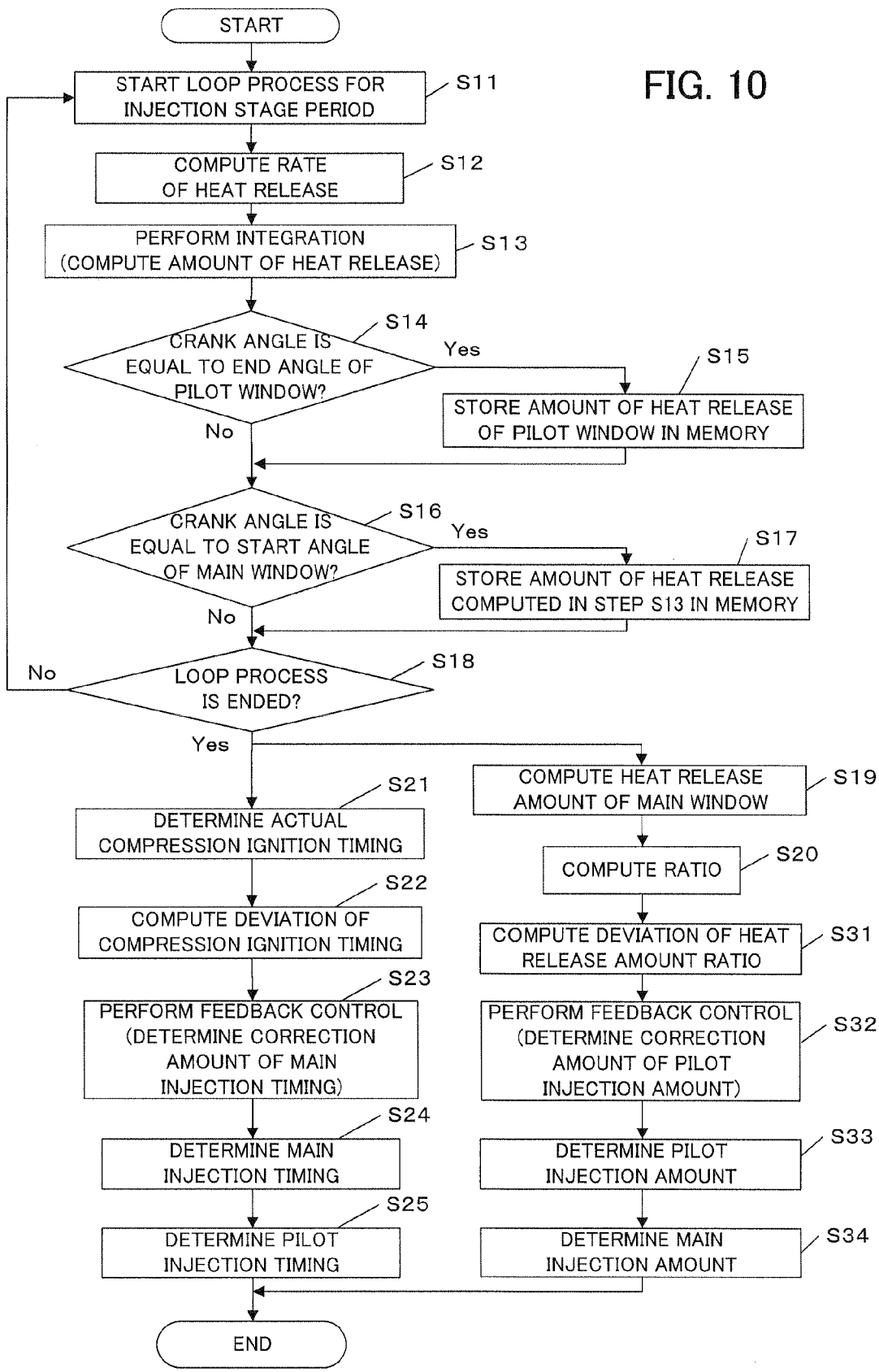
FIG. 10 is a flowchart illustrating a fuel control process according to the second embodiment.

FIG. 10 is a flowchart illustrating a fuel control process according to the second embodiment of FIG. 8. Only the points different from those of FIG. 9 will be described below.

If the crank angle used in the integration in step S13 corresponds to the start angle of the main window in step S16, the amount Q of heat release computed in step S13 is stored in the memory (S17). Here, as described above, the start angle of the main window can be obtained by referring to a predetermined map based on the detected engine rotational speed Ne and the required torque Trq.

When the loop process is ended in step S18, the process in steps S21 and S25 and the process in steps S19 to S20 and S31 to S34 are concurrently performed. Alternatively, the process in steps S21 to S25 and the process in steps S19 to S20 and S31 to S34 may be performed in series.

In step S19, the amount Qm of heat release of the main window is computed. For example, because the summation Qmax of the heat release amount of the injection stage is computed at the end of the loop process, the amount Qm of heat release of the main window can be computed by subtracting the heat release amount at the beginning of the main window, computed and stored in step S17, from the summation Qmax of the heat release amount.

Although not illustrated, alternatively, the amount Qm of heat release of the main window may be computed by subtracting the amount Qp of heat release of the pilot window from the summation Qmax if the pilot window and the main window are continuously set.

In step S20, the ratio R of the heat release amount Qm in the main window to the heat release amount Qp in the pilot window is computed. In step S31, a deviation between the computed ratio R and a target value R_CMD of the ratio is computed. The process in steps S32 to S34 are similar to those of FIG. 9. The correction amount for eliminating the deviation is determined, and the pilot injection amount and the main injection amount are determined according to the correction amount.

As described above, the heat release amount may be computed only for the pilot window when the actual compression ignition timing is detected based on another parameter indicating the combustion state. Further, in the above embodiments, after the injection stage, the operation is performed using the rate of pressure change $dP/d\theta$ and the in-cylinder pressure PCYL that are measured in the injection stage. Alternatively, the computation of the heat release rate and the integration may performed at time intervals in the injection stage in response to the measurement of the rate of pressure change $dP/d\theta$ and the in-cylinder pressure PCYL.

Although the embodiments are described by taking the Diesel engine as an example, the invention can be also applied to a gasoline engine and the like. Further, the invention can be applied to a general-purpose internal combustion engine such as an outboard engine.

What is claimed is:

1. A control apparatus for controlling fuel injection for an internal combustion engine, comprising:

means for injecting fuel into a cylinder of the internal combustion engine with the fuel injection divided into main injection and pilot injection in advance of the main injection;

means for detecting an actual compression ignition timing based on a combustion state in the cylinder;

means for controlling a fuel injection timing of the main injection based on the actual compression ignition timing;

means for determining an amount of heat release based on the pilot injection;

correction means for correcting a fuel injection amount of the pilot injection based on the determined amount of heat release, means for determining an amount of heat release based on the main injection; and means for determining a ratio of the amount of heat release based on the pilot injection and an amount of heat release based on the main injection, wherein the correction means corrects the fuel injection amount of the pilot injection based on the determined ratio.

2. The control apparatus according to claim 1, further comprising means for determining a correction amount for causing the amount of heat release based on the pilot injection to converge to a target amount of heat release, wherein the correction means corrects a target injection amount with the correction amount to determine the fuel injection amount of the pilot injection.

3. The control apparatus according to claim 1, further comprising means for determining a correction amount for causing the determined ratio to converge to a target value, wherein the correction means corrects a target injection amount with the correction amount to determine the fuel injection amount of the pilot injection.

4. A method for controlling fuel injection for an internal combustion engine, comprising:

injecting fuel into a cylinder of the internal combustion engine with the fuel injection divided into main injection and pilot injection in advance of the main injection;

detecting an actual compression ignition timing based on a combustion state in the cylinder;
controlling a fuel injection timing of the main injection based on the actual compression ignition timing;
determining an amount of heat release based on the pilot injection;
correcting a fuel injection amount of the pilot injection based on the determined amount of heat release,
determining an amount of heat release based on the main injection; and
determining a ratio of the amount of heat release based on the pilot injection and an amount of heat release based on the main injection,
wherein the correcting corrects the fuel injection amount of the pilot injection based on the determined ratio.

5. The method according to claim 4, further comprising determining a correction amount for causing the amount of heat release based on the pilot injection to converge to a target amount of heat release,
  wherein the correcting corrects a target injection amount with the correction amount to determine the fuel injection amount of the pilot injection.

6. The method according to claim 4, further comprising determining a correction amount for causing the determined ratio to converge to a target value,
  wherein the correcting corrects a target injection amount with the correction amount to determine the fuel injection amount of the pilot injection.

* * * * *